April 9, 1963

G. W. BURGESS 3,084,951

STEERING SYSTEM

Filed June 6, 1960

INVENTOR.
GLEN W. BURGESS
BY
*J. P. Wiessler*
ATTORNEY

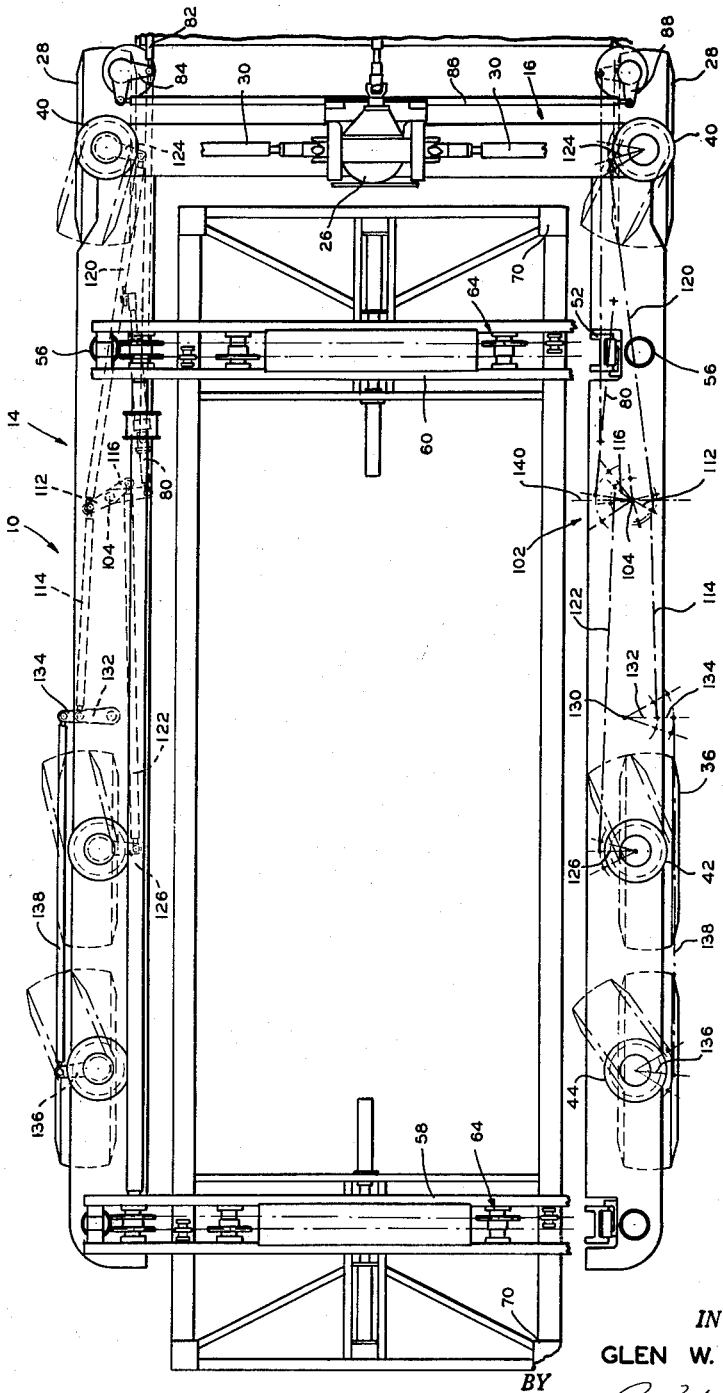

April 9, 1963  G. W. BURGESS  3,084,951
STEERING SYSTEM
Filed June 6, 1960  3 Sheets-Sheet 3
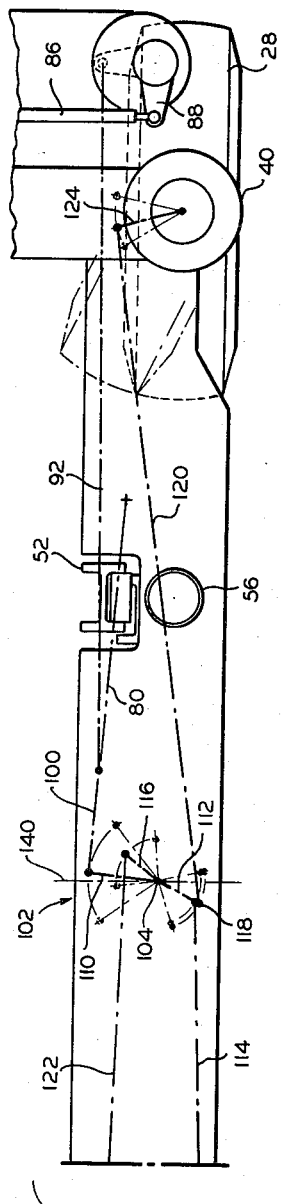
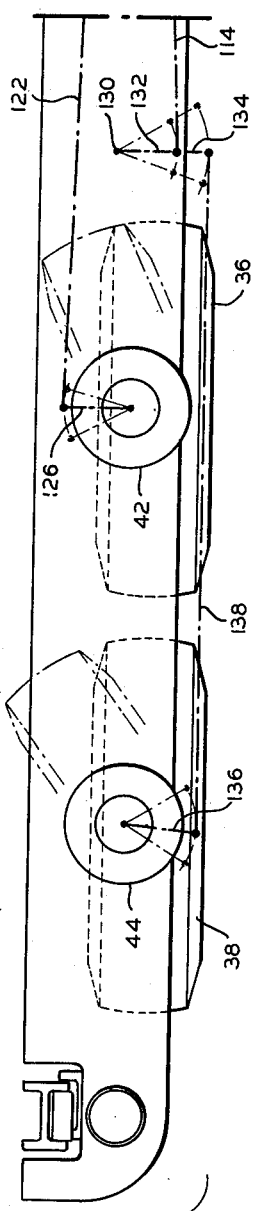
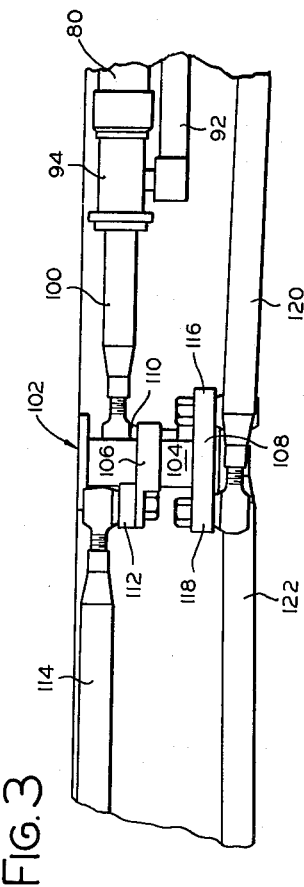
FIG. 4  FIG. 3
INVENTOR.
GLEN W. BURGESS
BY
ATTORNEY United States Patent Office 3,084,951
Patented Apr. 9, 1963

3,084,951
STEERING SYSTEM
Glen W. Burgess, Battle Creek, Mich., assignor to Clark Equipment Company, a corporation of Michigan
Filed June 6, 1960, Ser. No. 34,116
7 Claims. (Cl. 280—91)

This invention relates to a steering system for vehicles having at least six wheels, and more particularly to a steering system for large vehicles providing steering in either direction about a substantially common center. In carrying out the invention I have provided for differential steering angles as between each of at least three dirigible wheels on each side of the vehicle as well as between each transversely spaced pair of such wheels on opposite sides of the vehicle.

It is the primary object of the invention to provide steering system mechanism which effects differential steering angles between at least three pairs of dirigible vehicular wheels in open frame type vehicles wherein at least two pairs of such wheels are not connected by axles or the like.

Other objects, features and advantages of the present invention will appear in the following description taken in conjunction with the accompanying drawings, wherein:

FIGURE 1 is a side view in elevation illustrating the steering system of the present invention associated with a representative type of vehicle in which it has particularly advantageous application;

FIGURE 2 is a plan view of the vehicle illustrated in FIGURE 1 showing the steering system in non-steering position, as well as illustrating diagrammatically on one side of the vehicle locations of the various parts of the steering system in extreme right and left hand steering positions;

FIGURE 3 is an enlarged partial view in side elevation showing a portion of FIGURE 1; and FIGURE 4 is an enlarged interrupted plan view of the portion of the steering system illustrated diagrammatically in FIGURE 2.

Referring now in detail to the drawings, a straddle type van carrier is illustrated generally at numeral 10 having an open bay formed between a pair of longitudinally extending parallel side frame constructions 12 and 14 secured together at the rearward ends by a transverse frame construction 16 from which is suitably supported a rearwardly extending platform 18 having support rods 20 connecting each side thereof to side frame constructions 12 and 14. An operator station 22 and engine and transmission compartment 24 is located upon the platform, the power train components being drivably connected to a differential drive mechanism 26 which is suitably connected to a pair of steering-driving rear wheels 28 by shaft members 30 and chain and sprocket mechanism 32 and 34 connecting the shaft members 30 with wheels 28. Additional pairs of dirigible wheels 36 and 38 are mounted upon opposite side frame constructions 12 and 14 in close tandem relationship. Each of the wheels is resiliently mounted from the side frame constructions 12 and 14 by means of coil springs, not shown, enclosed within vertically extending wheel mounting fork tubes 40, 42 and 44 which extend through each side frame construction in longitudinally spaced relation.

Two pairs of longitudinally spaced telescoping upright constructions 50 and 52 are mounted in opposite end portions of the U-shaped bay formed by the side and end frame construction of the vehicle and are adapted to be raised and lowered by means of pairs of adjacent hydraulic hoist motors 54 and 56 which are connected to the opposite ends of a pair of transversely extending lifting arches 58 and 60 located in opposite end portions of the vehicle frame for movement vertically thereabove. A lifting frame construction shown generally at numeral 62 is suspended in the U-shaped vehicle frame from the lifting arches 58 and 60 by means of sprocket and chain mechanism in each lifting arch as illustrated generally at numeral 64. The arrangement is such that actuation vertically of the lifting arches 58 and 60 by the pairs of hydraulic motors 54 and 56 and upright assemblies 50 and 52 causes lifting frame 62 to be actuated by the chain and sprocket mechanism 64 at a 2:1 movement ratio relative to movement of the lifting arches. Locking dog assemblies 70 are located in each corner section of the lifting frame 62 for engaging adaptor means located in the upper portion of van containers to be engaged and transported by the vehicle within the open bay of the frame.

The construction and operation of the vehicle per se is disclosed fully in co-pending application Serial No. 32,327, filed June 6, 1960, in the name of Elmer G. Bjorklund (common assignee). The present steering system is, not, of course, intended to be restricted in its application to the vehicle of the particular type above described, which is disclosed generally herein primarily for the purpose of setting forth a typical environment in which the steering system of the present invention may be embodied.

Referring now to the construction of the steering system of the present invention as embodied in the straddle carrier vehicle above described, an operator's steering wheel, not shown, is located in the compartment 22 at the rear end of the vehicle and is operatively connected with a pair of transversely spaced hydraulic power boost cylinders 80 by means of a link 82, a bell crank 84, a transverse rod 86, a crank 88, a pair of vertically extending and transversely spaced shafts 90, a pair of opposed transversely inwardly extending crank arms 91, a pair of forwardly extending links 92 located beneath vehicle side constructions 12 and 14, and a pair of hydraulic servo valves 94 connected to the forward ends of links 92 and movable in either direction along a piston rod 96 to cause follow-up movement of the pair of power cylinders 80 in either direction. Piston rods 96 are supported pivotally at the rear ends thereof by a pair of downwardly depending brackets 98 which are secured to the undersides of the lower frame members of side frame constructions 12 and 14, whereas each cylinder 80 has a forward extension 100 connected thereto for actuating a center steer arm assembly 102 in a selected direction of rotation upon energization of the power cylinders, said cylinders being actuated simultaneously in opposite directions upon steering control movement.

In the description which follows reference will be made only to those parts of the steering construction which appear diagrammatically on the one side of the vehicle in FIGURE 1, such parts being duplicated on the opposite side of the vehicle and identified by the same numerals. The center steer arm assembly 102 comprises a downwardly depending rotatable shaft 104 which is mounted in the underside of frame construction 12 and to which is secured for rotation a pair of vertically spaced double crank arms 106 and 108. Crank 106 includes crank arms 110 and 112 extending horizontally outwardly on opposite sides of shaft 104 and being connected pivotally with cylinder extension 100 and an upper tie rod 114, respectively. Lower crank 108 also comprises a pair of crank arms 116 and 118 which extend horizontally outwardly of the shaft 104 on opposite sides thereof for pivotal connection with rear wheel tie rod 120 and center wheel tie rod 122, respectively. Tie rod 120 is connected by a crank arm 124 at the rear end thereof to the one wheel 28 transversely inwardly of said wheel for actuating the wheel steerably in either direction about the axis of the vertical fork tube 40, and center wheel tie rod 122 is connected to the center wheel 36 transversely inwardly thereof by means of a crank arm 126 which is actuatable to similarly steer the wheel 36 in either direction. The upper or forward wheel tie rod 114 is operatively connected to front wheel 38 by means of a crank assembly 130 depending downwardly from frame construction 12 at a location somewhat rearwardly of center wheels 36; it comprises a pair of parallel crank arms 132 and 134 extending horizontally outwardly of frame 12, arm 134 being relatively long and connected with the forward wheel crank arm 136 by means of a lower forward wheel tie rod 138.

The entire steering assembly as illustrated is shown in a neutral or non-steer position. In FIGURES 2 and 4 limits of movement in right and left hand steer are shown diagrammatically by the various crank arm pivot positions indicated in association with each arch which illustrates the path of movement of each crank arm. For illustrative purposes a specific design of the steering assembly is shown wherein it will be noted that splay is provided between the wheels of each pair of transversely spaced wheels from the front to the rear of the vehicle by means of the geometrical relations of the respective crank arm connections to the wheels and to the center steer arm assembly 102, as illustrated. "Splay," as used herein, denotes the difference in steering angles between the wheels of each pair of three pairs of longitudinally spaced wheels during right and left hand turning operations of the vehicle. Also, that as between the three longitudinally spaced wheels on each side of the vehicle differential steering is accomplished by the provision of crank arms of different lengths associated with the various wheels for actuating the same through the aforementioned tie rods.

The geometry of the steering assembly will, of course, vary in different applications depending upon the wheel base and the relative longitudinal spacing between the various wheels, but in the particular embodiment illustrated the length of crank arm 116 in combination with the angle between the axis of arm 116 and the transverse axis 140, and the length and angular position of center wheel crank arm 126 will actuate center wheel 36 a maximum of substantially 24°25' in a counterclockwise direction, as seen in FIGURE 2, for left hand steering operation, and a maximum of substantially 14°44' in the opposite direction. In stating these limiting steer angles it is assumed, of course, that the limits of movement are as indicated by the end points of the arc associated with power cylinder 80 for rotating shaft 104 of center steer arm assembly 102. Likewise, the geometry of crank arm 118 is related to crank arm 124 of rear wheel 28 such that wheel 28 may rotate substantially 26°34' in a clockwise direction for left hand steer, and substantially 16°9' in the opposite direction for right hand steer. Crank arm 112 is slightly shorter than crank arm 118 and is connected to the relatively short crank 132 which actuates the relatively long crank 134 of the crank arm assembly 130, which in turn actuates the crank 136 of the forward wheel 38 such that said wheel is actuated in a counterclockwise direction a maximum of substantially 36°53' for left hand steer and in the opposite direction a maximum of substantially 23°29' for right hand steer.

The foregoing differential steering angles which are effected by the present steering system both with respect to the wheels of each transversely related pair of wheels and as between each of the three wheels on each side of the vehicle, provide theoretically ideal differential steering about a common center which is located at a substantially common point of intersection of the turning radii of the six dirigible wheels when the same are turned for either right or left hand steering operation. Stated in another way, the above disclosed steering connections and geometry in the particular embodiment illustrated is such that the inside wheels 38, 36 and 28 on either side may be cramped a maximum of 36°53', 24°25', and 26°34', respectively, whereas the outside wheels 38, 36 and 28 during such a turn may be cramped a maximum of 23°29', 14°44', and 16°9', respectively, which combination effects a common center about which the entire vehicle and the six wheels pivot in either direction.

From the foregoing it will now be clear to persons skilled in the art that I have provided a six wheel steering system, the principles of which are applicable to vehicles having more than six wheels, as well as to vehicle types and machines substantially different than that disclosed herein for illustrative purposes.

Now, while I have shown and described but a single embodiment of the present invention, it will be understood that various rearrangements and modifications may be made therein without departing from the spirit and scope of my invention.

I claim:

1. A steering system for U-shaped vehicles having an unobstructed load handling pocket and three pairs of transversely spaced wheels spaced longitudinally of the vehicle, comprising operator control means operatively connected to each wheel for providing differential steering angles between the three wheels on each side of the vehicle and between the respective ones of each said pair of wheels, said operative connection including a main steering arm assembly located longitudinally intermediate the front and rear wheels on each side of the vehicle and in the vertical plane of the respective sides, actuator means for pivoting each said steering arm assembly in either direction from a neutral position thereof, a plurality of first crank arms secured to and extending outwardly of each said steering arm assembly at predetermined angles relative to an axis transverse of the vehicle, a plurality of second crank arms operatively connected to and extending outwardly of different ones of the wheels on each side of the vehicle, and tie rod means extending longitudinally of and in the vertical plane of each side of the vehicle and connecting respective ones of said first crank arms to respective ones of said second crank arms, said first and second crank arms, said tie rod means and said steering arm assemblies being so constructed and arranged that pivotal movement of said main steering arm assembly in either direction produces predetermined differential dirigible movement of the three wheels on each side of the vehicle both with respect to each longitudinally related wheel and with respect to each transversely related wheel.

2. A steering system for U-shaped vehicles having an unobstructed load handling pocket and at least three pairs of transversely spaced wheels spaced longitudinally of the vehicle, comprising operator control means operatively connected to each wheel for providing differential steering angles between the three wheels on each side of the vehicle, said operative connection including a main steering arm assembly located longitudinally intermediate the front and rear wheels and in the plane of one side of the vehicle, actuator means for pivoting said steering arm assembly in either direction from a neutral position thereof, a plurality of first crank arms secured to and extending transversely outwardly of said steering arm assembly in vertically spaced relation to each other, a plurality of second crank arms operatively connected to and extending transversely outwardly of different ones of the wheels on one side of the vehicle, and tie rod means in the plane of said one side connecting respective ones of said first crank arms to respective ones of said second crank arms, said second crank arms being of predetermined length relative to said first crank arms, said first and second crank arms and said tie rod means being so constructed and arranged that pivotal movement of said main steering arm assembly in either direction produces predetermined differential dirigible movement of the three wheels on said one side of the vehicle such that said three wheels move arcuately during turning of the vehicle about a substantially common center.

3. A steering system for vehicles having an open U-shaped frame and three pairs of transversely spaced wheels spaced longitudinally of the vehicle, comprising operator control means operatively connected to each wheel for actuating each such wheel in predetermined differential steering relationship to each other wheel, said operative connection including a main steering arm assembly in the plane of each side of the vehicle, actuator means for pivoting each said steering arm assembly in either direction from a neutral position thereof, a plurality of first crank arms secured to and extending outwardly of each said steering arm assembly in predetermined angular relationship to each other, a plurality of second crank arms operatively connected to and extending outwardly of different ones of the wheels on each side of the vehicle, and tie rod means extending longitudinally of the vehicle and in the plane of each side thereof connecting respective ones of said first crank arms to respective ones of said second crank arms on each side of the vehicle.

4. A steering system for U-shaped vehicles having an unobstructed load handling pocket and three pairs of transversely spaced wheels spaced longitudinally of the vehicle and supported from the legs of said U-shaped frame, comprising operator control means operatively connected to each of the six wheels for providing two directional steering control at each wheel, said operative connection including a main steering arm assembly located longitudinally intermediate the front and rear wheels and in the plane of each side of the vehicle, actuator means for pivoting each said steering arm assembly in either direction from a neutral position thereof, a plurality of first crank arms of predetermined length secured to and extending outwardly of each said steering arm assembly in different directions, a plurality of second crank arms of predetermined lengths operatively connected to and extending outwardly of different ones of the wheels on each side of the vehicle, and tie rod means extending longitudinally of the vehicle and in the plane of each side thereof connecting respective ones of said first crank arms to respective ones of said second crank arms, said first and second crank arms and said tie rod means being so constructed and arranged that pivotal movement of said main steering arm assemblies in either direction produces predetermined dirigible movement of the three wheels on each side of the vehicle.

5. A steering system for vehicles as claimed in claim 4 wherein one of each of the tie rods of said tie rod means comprises first and second tie rod elements connected longitudinally intermediate the respective main steering arm assembly and a respective one of said wheels by third crank arm means supported from the vehicle.

6. A construction as claimed in claim 4 wherein said steering system provides splay such that differential steering angles are provided both between the wheels of each transversely spaced pair of the three pairs of dirigible wheels and between each of the three wheels on each side of the vehicle.

7. A steering system for vehicles as claimed in claim 4 wherein said main steering arm assembly, said first and second crank arms, and said tie rod means depend from below the U-shaped frame of the vehicle.

References Cited in the file of this patent

UNITED STATES PATENTS

| | | |
|---|---|---|
| 1,709,741 | Romine | Apr. 16, 1929 |
| 1,731,558 | Wright | Oct. 15, 1929 |
| 1,786,060 | Greaves et al. | Dec. 23, 1930 |
| 1,862,287 | Towson | June 7, 1932 |
| 1,919,170 | Remde | July 18, 1933 |
| 2,197,926 | Dunham | Apr. 23, 1940 |
| 2,358,236 | Lee | Sept. 12, 1944 |
| 2,804,158 | Yunker | Aug. 27, 1957 |
| 2,915,319 | Kumler et al. | Dec. 1, 1959 |